June 29, 1965
C. B. BRAHM
3,192,371
FEEDBACK INTEGRATING SYSTEM
Filed Sept. 14, 1961
4 Sheets-Sheet 1
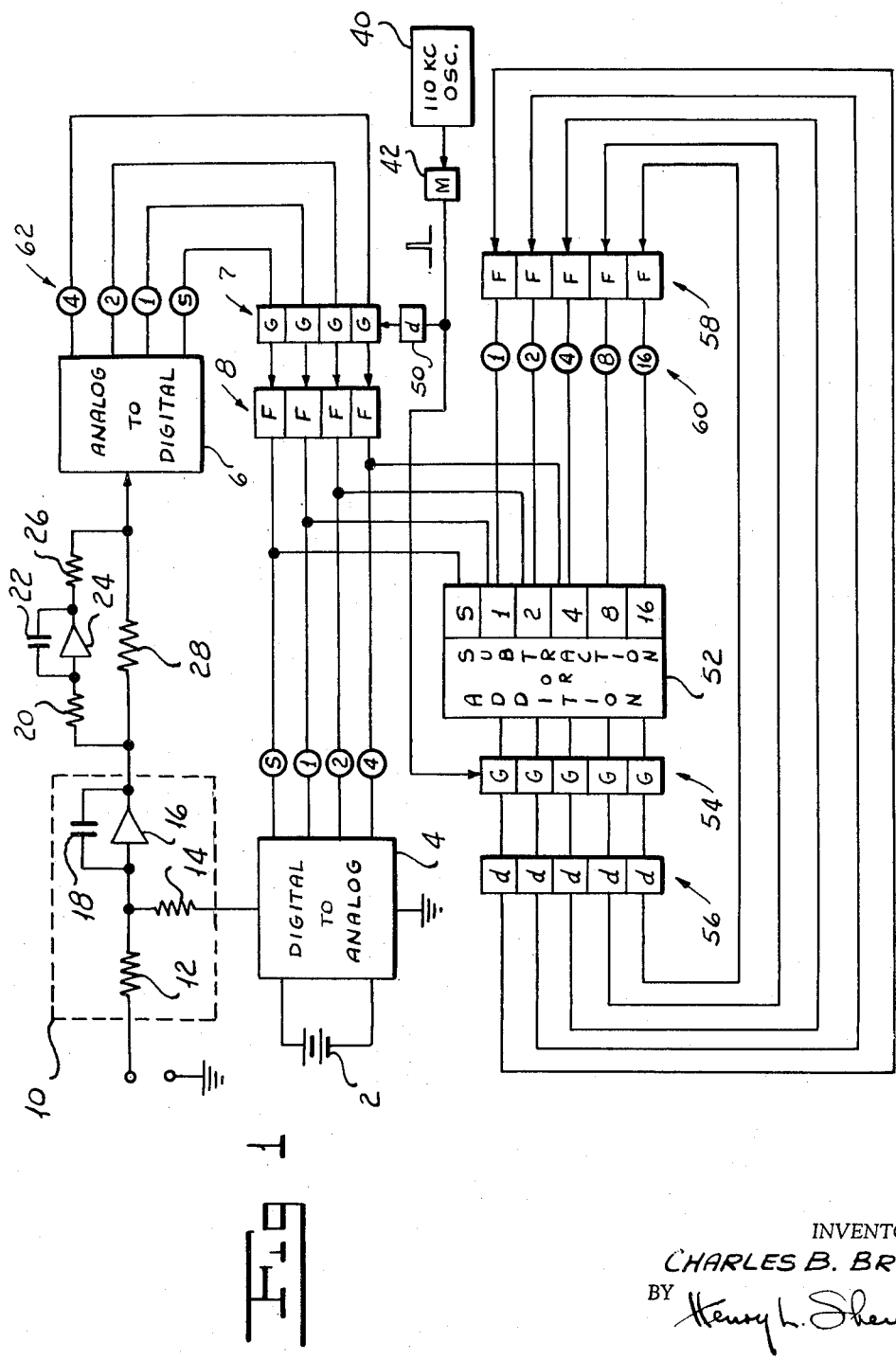
INVENTOR.
CHARLES B. BRAHM
BY
ATTORNEY

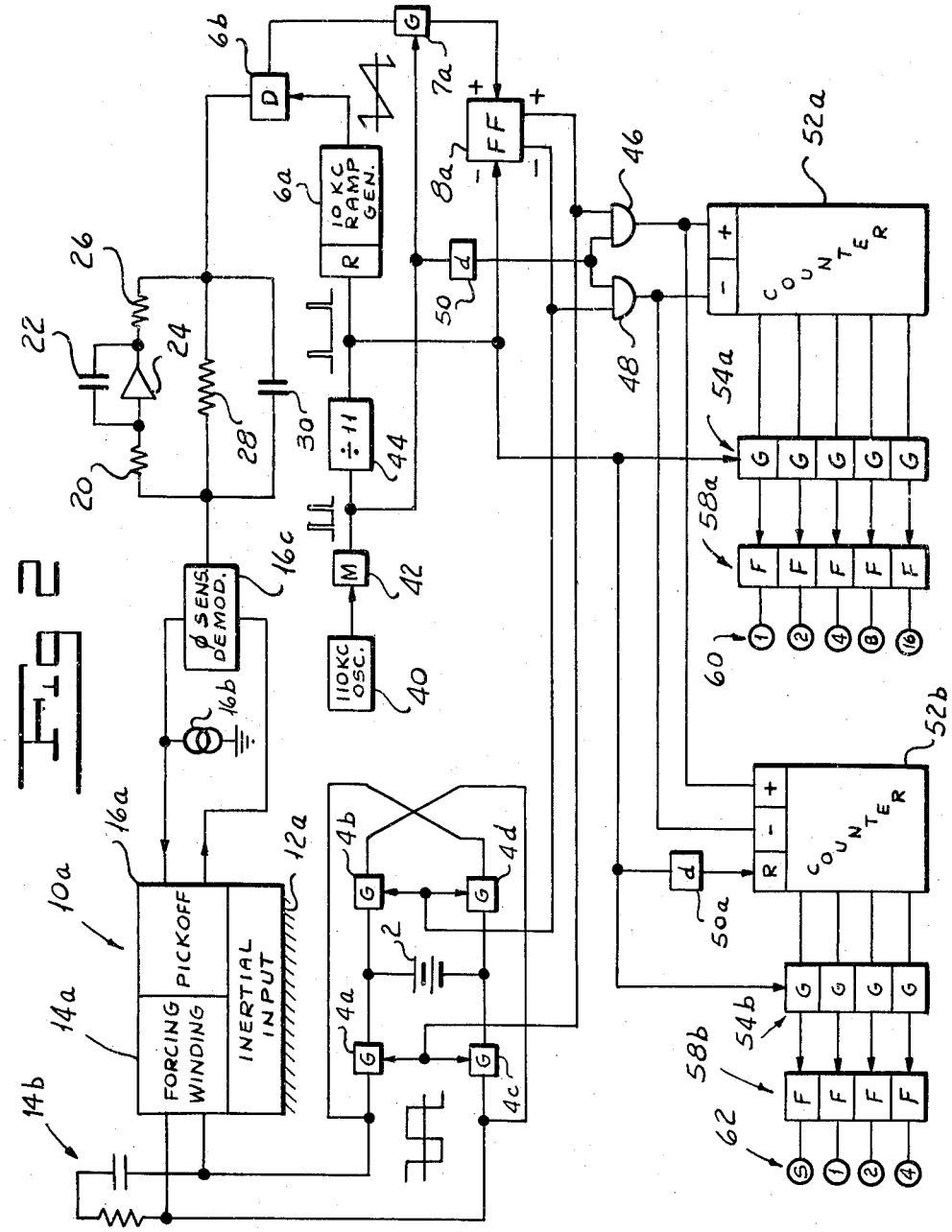

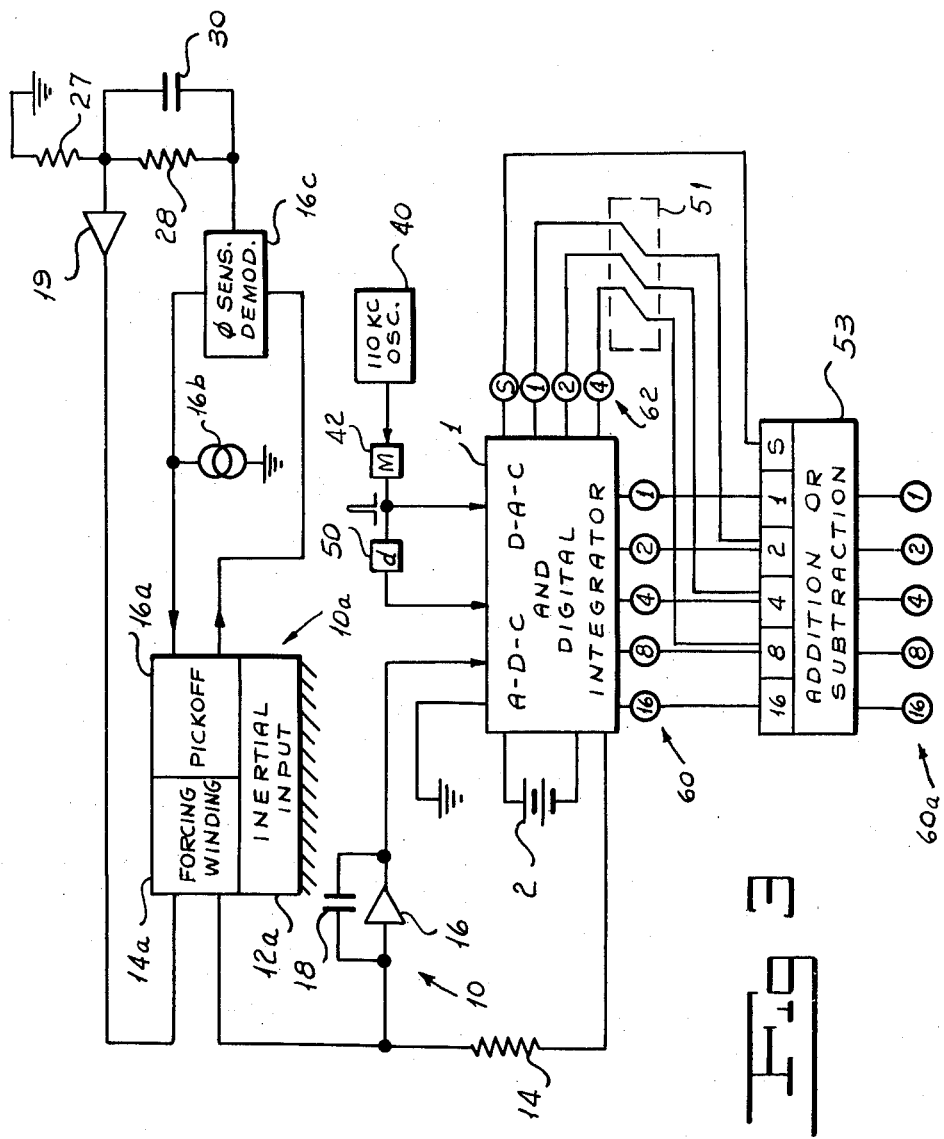

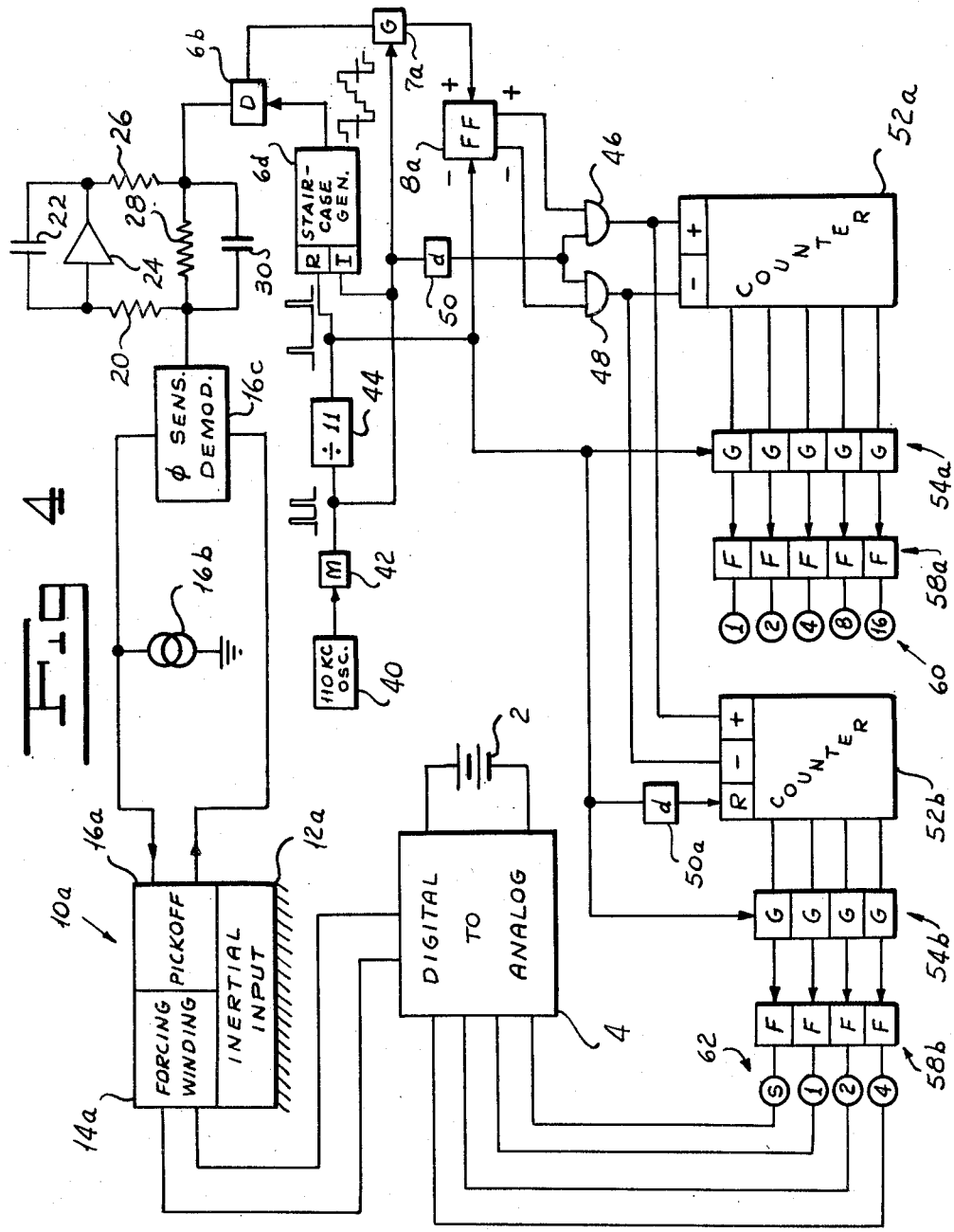

United States Patent Office 3,192,371
Patented June 29, 1965

3,192,371
FEEDBACK INTEGRATING SYSTEM
Charles B. Brahm, Ellington, Conn., assignor to United Aircraft Corporation, East Hartford, Conn., a corporation of Delaware
Filed Sept. 14, 1961, Ser. No. 138,008
9 Claims. (Cl. 235—183)

My invention relates to feedback integrating systems and more particularly to an integrating system having an analog input and providing a digital output which employs both analog and digital integrators. My system is particularly useful in integrating the indications of accelerometers and gyroscopes.

In the prior art current pulses containing a predetermined magnitude of charge have been applied to the forcing windings of gyros and accelerometers. These pulses are counted with regard to sense to provide a digital integration. In order to achieve high resolution, it is necessary that the pulse increments be relatively small. In order to achieve a wide dynamic range, it is therefore necessary that the frequency of pulsing be relatively high. Because of unavoidable inertial lags in accelerometers and gyros, the output error signal which controls the sense of the current pulses cannot immediately follow the high frequency transients produced by the pulsing. Accordingly, the system provides digital output indications which tend to be highly oscillatory even though rate damping circuits may be employed in an attempt to stabilize the digital indications. Accordingly, in such systems of the prior art employing a fixed current pulse, the actual resolution is much poorer than the theoretical resolution based upon the incremental value of a single pulse, since digital output indications oscillate through many pulse increments. This greatly magnifies errors due to slight nonequivalence of positive and negative pulses, the magnification being proportional to the product of the amplitude and frequency of oscillation. Furthermore in such systems of the prior art the frequency of pulsing is limited by the inductance of the forcing winding. Finally in such pulsing systems of the prior art, no steady state indication of the quantity to be integrated is provided, since the only effective indication is a time average which must be adequately filtered and smoothed to provide a steady state indication.

I have invented a proportional digital integrating system especially adapted for use in conjunction with accelerometers and gyroscopes which provides an actual resolution which closely approaches the theoretical resolution, in which the magnitude of oscillations is reduced to a few increments; in which errors due to nonequivalency are not appreciably magnified; in which the current through the forcing winding approaches direct-current so that the inductance of the winding no longer imposes a limitation on the frequency of pulsing; and in which steady state indications of the magnitude of the quantity to be integrated are provided.

One object of my invention is to provide a feedback integrating system having a proportional response which generates steady state indications of the quantity to be integrated.

Another object of my invention is to provide a feedback integrating system especially adapted for use in conjunction with accelerometers and gyroscopes which has a proportional response approaching direct-current so that the time-constant of the forcing winding is not of limiting importance and so that a high pulsing frequency may be achieved.

Still another object of my invention is to provide a proportional feedback integrating system in which the actual resolution approaches the theoretical resolution and in which slight nonequivalency of positive and negative pulses is not appreciably magnified.

A further object of my invention is to provide a proportional feedback integrating system in which oscillatory tendencies are curbed to a few increments.

Other and further objects of my invention will appear from the following description.

In general my invention contemplates the provision of an analog input which is compared with a digitally-generated analog feedback signal to provide an analog error signal. The error signal is subjected to analog integration. The integrated analog error signal is converted to a digital indication. It is the digital indication of the integrated analog error signal which is used to generate the feedback analog signal. The digital indication of the integrated analog error signal is digitally integrated. In one form of my invention the analog integrator may comprise an accelerometer or a single-degree-of-freedom gyroscope. In another form of my invention the analog integrator may comprise a high-gain direct-current feedback amplifier. In still another form of my invention the digitizing of the output of the analog integrator is accomplished by pulse-width modulation. In a further form of my invention the digitally generated analog feedback signal is provided by pulse-width modulation. In a still further form of my invention the analog feedback signal is generated by a weighted-bit digital-to-analog converter. My analog integrator operates in a step-wise proportional closed loop.

In the accompanying drawings which form part of the instant specification and which are to be read in conjunction therewith and in which like reference numerals are used to indicate like parts in the various views:

FIGURE 1 is a schematic view showing an embodiment of my invention which includes an electronic analog integrator, a weighted-bit analog-to-digital converter, and a weighted-bit digital-to-analog converter.

FIGURE 2 is a schematic view of an embodiment of my invention including a mechanical analog integrator, a pulse-width analog-to-digital converter, and a pulse-width digital-to-analog converter.

FIGURE 3 is a schematic view showing an embodiment of my invention in which a mechanical analog integrator such as a gyroscope or accelerometer is directly nulled by an analog feedback signal used as the input signal to an electronic analog integrator.

FIGURE 4 is a schematic view of an embodiment of my invention including a pulse-width analog-to-digital converter and a weighted-bit digital-to-analog converter.

Referring more particularly now to FIGURE 1 of the drawings, I provide a high-gain, chopper-stabilized, direct-current amplifier 16 which is provided with a feedback capacitor 18 and a temperature-compensated, input resistor 12. The source of input voltage to be integrated is coupled through the input resistor 12 to amplifier 16. A temperature-compensated, feedback resistor 14 is also coupled to the input of amplifier 16. The reference numeral 10 incorporates elements 12, 14, 16, and 18 and indicates an analog integrator which provides an output in accordance with the integral of the difference between the two inputs through resistors 12 and 14. The output of amplifier 16 is coupled through an input resistor 20 to a high-gain, chopper-stabilized, direct-current feedback amplifier 24 which is provided with a feedback capacitor 22. The outputs of amplifiers 16 and 24 are coupled through respective summing resistors 28 and 26 to binary-coded, analog-to-digital converter 6, having a plurality of output terminals indicated generally by the reference numeral 62 at which are provided the respective indications S, 1, 2, and 4. Output terminals 62 are coupled through four simultaneously-actuated gates indicated generally by the reference numeral 7 to the respective input terminals of four single-input flip-flops indicated generally by the reference numeral 8. The outputs of flip-flops 8 are coupled respectively to the S, 1, 2, and 4 terminals of a digital-to-analog converter 4 which is supplied with a stable voltage source such as battery 2 and a ground reference input. The output of digital-to-analog converter 4 is coupled to feedback resistor 14. A temperature-compensated 110 kilocycles per second crystal oscillator 40 is coupled to a monostable multivibrator 42 which generates pulses which may conveniently be of one microsecond duration. The output of multivibrator 42 is coupled through a delay network 50, which may conveniently provide a time lag of six microseconds, to the control input of multiple gates 7. The respective outputs of flip-flops 8 are also connected to the S, 1, 2, and 4 inputs of a circuit 52 which performs either digital addition or digital subtraction in accordance with the polarity of the sign input S. I provide five single-input flip-flops indicated generally by the reference numeral 58. The outputs of flip-flops 58 are connected respectively to the 1, 2, 4, 8, and 16 output terminals indicated generally by the reference numeral 60. Output terminals 60 are connected to respective input terminals of addition or subtraction circuit 52. The respective outputs of addition or subtraction circuit 52 are coupled serially through five simultaneously-actuated gates indicated generally by the reference numeral 54 and then through five delay networks indicated generally by the reference numeral 56 to the inputs of corresponding flip-flops 58. Each of delay networks 56 may conveniently provide a time lag of four microseconds.

In operation of the circuit of FIGURE 1, amplifier 16 provides an output signal in accordance with the integral of the difference between the input voltage coupled through resistor 12 and the feedback voltage coupled through resistor 14. The error voltage output of amplifier 16 is subjected to further integration by amplifier 24 for reasons to be described hereinafter. The analog-to-digital converter 6 provides a digital output at terminals 62 in accordance with both the magnitude and the sense of its input voltage. Flip-flops 8 provide storage of a sampled value of the digital output of converter 6. The sampled digital indication provided by flip-flops 8 cause digital-to-analog converter 4 to provide the analog feedback signal through resistor 14. It will be appreciated that the analog input through resistor 12 may vary smoothly and continuously, whereas the digitally generated analog feedback signal through resistor 14 varies in discrete increments in accordance with the resolution of the system. Accordingly, in general, the feedback signal through resistor 14 will oscillate between a value which is slightly larger than and a value which is slightly smaller than the value of the input signal coupled through resistor 12. The delay clock pulse from multivibrator 42 through network 50 actuates gates 7 for one microsecond during the clock pulse period of approximately nine microseconds, thus setting flip-flops 7 in accordance with the output signals 62 of converter 6 which exist at such instant. The outputs of flip-flops 8 remain constant for a nine microsecond period until sampling gates 7 are again actuated in response to a delayed clock pulse from network 50. Accordingly, the digitally generated analog feedback signal from converter 4 remains constant during this interval. The outputs of flip-flops 8 are also coupled to a circuit 52 which digitally adds the outputs of flip-flops 8 to, or digitally subtracts the outputs of flip-flops 8 from, the outputs of flip-flops 58 in accordance with the polarity of the sign input S. The setting of flip-flops 8 by a delayed clock pulse from network 50 is followed three microseconds later by a new clock pulse which actuates gates 54 and couples the digital outputs of addition or subtraction circuit 52 to delay networks 56. Four microseconds later, the outputs of delay networks 56 set flip-flops 58 in accordance with the output of circuit 52. At output terminal 60 there is provided the cumulative digital summation of the outputs of flip-flops 8. This cumulative summation represents the digital integration of the outputs of flip-flops 8 and hence the digital integration of the step-wise variable analog feedback signal through resistor 14. Two microseconds after flip-flops 58 are set, a new delay clock pulse again actuates sampling gates 7 to set flip-flops 8 in accordance with the outputs 62 of converter 6. It will be appreciated that analog integrator 16 is operated in a closed feedback loop. Thus the output of integrator 16 is bounded and can not build up without limit. In the absence of the provision of integrator 24, the output of integrator 16 would build up to a value sufficient to generate a feedback signal through resistor 14 which substantially cancels the input through resistor 12. Thus in the absence of the provision of integrator 24, the output of integrator 16 represents an additional integration the results of which must be added to the digital integration provided at output terminals 60. In order to eliminate this source of error, I have provided integrator 24. It will be appreciated that the provision of integrator 24 causes the output of integrator 16 to operate susbtantially at a null, since integrator 24 provides the necessary signal to converter 6 for generating the step-wise analog feedback signal through resistor 14 which substantially cancels the input signal through resistor 12. It will be noted that the direct coupling of the output of integrator 16 to converter 6 through resistor 28 effectively by-passes integrator 24 at higher frequencies and insures stability, since only a ninety degree phase shift is provided by integrator 16. In the circuit of FIGURE 1, electronic integrator 16 has a high frequency response and does not introduce additional phase shifts as would mechanical analog integrators. Hence it is not necessary for purposes of stability to incorporate a phase-lead or differentiating circuit to prevent oscillation. The digital-to-analog converter 4 is a conventional weighted-bit device well known to the art. Analog-to-digital converter 6 incorporates a weighted-bit digital-to-analog converter (such as converter 4) in a feedback circuit with means for varying the digital indication to achieve a null. It will be appreciated, however, that converter 6 performs only a digitizing function and need not have high accuracy.

Referring now to FIGURE 2 of the drawings, I provide a mechanical integrator, such as an accelerometer or single-degree-of-freedom gyroscope, indicated generally by the reference character 10a. The inertial input 12a is acceleration in the case of an accelerometer and is angular velocity in the case of a gyroscope. The device 10a is provided with a forcing or torquing winding 14a and a pick-off 16a. Pick-off 16a is excited by an oscillator 16b. Pick-off 16a and oscillator 16b are coupled to a phase-sensitive demodulator 16c which provides a direct-current output signal in accordance with the magnitude and the polarity of the alternating-current output of pick-off 16a.

In accelerometer and single-degree-of-freedom gyroscopes, the movable element is internally damped either by the viscous friction forces of buoying fluids, by the currents induced in a forcing winding which is moving relative to a magnetic field, or by a combination of viscous damping and eddy current damping. In accelerometers, an input acceleration produces a force on the sensitive element which, in the absence of a feedback signal to the forcing winding, results in such velocity of the sensitive element relative to the housing that the damping force is equal to the force produced by the input acceleration. In single-degree-of-freedom gyroscopes, an input angular velocity produces a torque on the gimbal which, in the absence of a feedback signal to the torquing winding, results in such angular velocity of the gimbal relative to the housing that the damping torque is equal to the torque produced by the input angular velocity. In the absence of a feedback signal to the forcing winding of accelerometers, the sensitive element moves through a distance which, within limits, is proportional to the integral of the input acceleration. Since the pick-off produces a signal proportional to the distance moved, the pick-off signal represents velocity, which is the integral of acceleration. In the absence of a feedback signal to the torquing winding of single-degree-of-freedom gyroscopes, the gimbal moves through an angle which, within limits, is proportional to the integral of the input angular velocity. Since the pick-off produces a signal proportional to the angle through which it is rotated, the pick-off signal represents angular displacement which is the integral of angular velocity. Such velocity restrained single-degree-of-freedom gyroscopes are also known as integrating gyroscopes. In accelerometers, the feedback signal to winding 14a represents a digital approximation to input acceleration; and in single-degree-of-freedom gyroscopes, the feedback signal to winding 14a represents a digital approximation to input angular velocity. Accordingly, with the feedback loop to the forcing winding 14a operative, the device 10a provides a pick-off output 16a which is proportional to the analog integration of the difference between the inertial input 12a and the digital approximation to the inertial input which is coupled to the forcing winding 14a.

The output of phase-sensitive demodulator 16c is coupled through input resistor 20 to amplifier 24 which is provided with feedback capacitor 22. The output of demodulator 16c is coupled through a summing resistor 28 and a differentiating capacitor 30 to a first input of a high-gain differential amplifier 6b. The output of electronic integrator 24 is coupled through a summing resistor 26 to the first input of differential amplifier 6b. The 110 kilocycle crystal oscillator 40 drives monostable multivibrator 42 which generates one microsecond pulses. The output of multivibrator 42 is coupled to a ring counter 44 which divides the number of input pulses by a factor of eleven to produce output pulses of one microsecond duration at the rate of ten kilocycles per second which are synchronous with the pulses of multivibrator 42. The output of pulse divider 44 is coupled to the retrace input of a ten kilocycle ramp function generator 6a. The output of ramp generator 6a is a triangular wave-form substantially symmetrical about ground potential and is coupled to the second input of differential amplifier 6b. Differential amplifier 6b provides an output only when the second input from ramp generator 6a becomes more positive than the signals applied from demodulator 16c and integrator 24 to its first input. The output of differential amplifier 6b is coupled through a gate 7a to the positive-setting input of a bistable flip-flop 8a. The output of multivibrator 42 is connected to the control input of gate 7a. The output of pulse divider circuit 44 is connected to the negative-setting input of bistable flip-flop 8a. Flip-flop 8a provides complementary outputs of opposite polarity. The positive output of flip-flop 8a is coupled to one input of AND circuit 46 and to the control inputs of gates 4a and 4c. The negative output of flip-flop 8a is connected to one input of an AND circuit 48 and to the control input of gates 4b and 4d. The output of multivibrator 42 is connected through six microsecond delay network 50 to the other input of each of AND circuits 46 and 48. The output of AND circuit 46 is connected to the positive counting input of each of counters 52a and 52b; and the output of AND circuit 48 is connected to the negative counting input of each of counters 52a and 52b. The outputs of counter 52a are connected through five simultaneously-actuated gates, indicated generally by the reference character 54a, to the respective inputs of five single-input flip-flops, indicated generally by the reference character 58a. The outputs of flip-flops 58a are connected to the respective 1, 2, 4, 8, and 16 output terminals 60. Counter 52b is provided with a resetting terminal which causes the output of the counter to revert to zero. The outputs of counter 52b are connected through four simultaneously actuated gates, indicated generally by the reference character 54b, to the respective inputs of four single-input flip-flops, indicated generally by the reference character 58b. The outputs of flip-flops 58b are connected to the S, 1, 2, and 4 terminals 62. The output of frequency divider circuit 44 is connected to the control input of multiple gates 54a, to the control input of multiple gates 54b, and through a delay network 50a to the resetting input of counter 52b. Delay network 52a may conveniently provide a time lag of three microseconds. Battery 2 provides a stable voltage source. One terminal of winding 14a is connected through gate 4a to the positive terminal of battery 2 and through gate 4d to the negative terminal of battery 2. The other terminal of winding 14a is connected through gate 4c to the negative terminal of battery 2 and through gate 4b to the positive terminal of battery 2. Gates 4a through 4d act as a reversing switch to control the polarity of current through winding 14a.

In operation of the circuit of FIGURE 2, pick-off 16a provides an output signal in accordance with the integral of the difference between the force produced by an inertial input 12a and the force produced by current through winding 14a. The alternating-current error signal from pick-off 16a produces a corresponding direct-current output from demodulator 16c. The output of demodulator 16c is directly coupled to the first input of differential amplifier 6b through resistor 28. The integral and the derivative of the output of demodulator 16c are also coupled to the first input of differential amplifier 6b. Differential amplifier 6b provides an output only when the input from ramp generator 6a becomes more positive than the sum of the three signals applied to its first input. The time period required for the ramp function output of generator 6a to sweep from its maximum negative excursion to its maximum positive excursion is one hundred microseconds. If the combination of signals applied to the first input of differential amplifier 6b is zero, then the differential amplifier will provide an output fifty microseconds after retrace in response to a pulse from divider 44. If the combination of signals results in a positive voltage applied to the first input of differential amplifier 6b, then the differential amplifier will produce an output more than fifty microseconds after retrace. If a negative voltage is applied to differential amplifier 6b, then it will provide an output less than fifty microseconds after retrace. Flip-flop 8a is set negative simultaneously with the retrace of ramp generator 6a. Gate 7a causes flip-flop 8a to be set positive by the first clock pulse from multivibrator 42 which occurs after the production of an output by differential amplifier 6b. Since clock pulses from multivibrator 42 occur at substantially nine microsecond intervals, gate 7a is actuated then nine microseconds after retrace, again at eighteen microseconds after retrace, and still again at twenty-seven microseconds after retrace. Thus if differential amplifier 6b provides an output twenty-two microseconds after retrace, flip-flop 8a will not be set positive until twenty-seven microseconds after retrace. The positive setting of flip-flop 8a is digitally controlled by gate 7a in response to clock pulses from multivibrator 42. Flip-flop 8a is set positive within a period after retrace which varies in discrete nine microsecond increments. When flip-flop 8a is set negative upon retrace, gates 4b and 4d cause a negative current flow through winding 14a; and when flip-flop 8a is set positive, gates 4a and 4c cause a positive current flow through winding 14a. The net current flow through winding 14a during any one hundred microsecond period of ramp generator 6a is proportional to the difference in times of positive and negative current flow. Thus the digital time indications of flip-flop 8a are converted to a corresponding analog signal. When flip-flop 8a is set negative upon retrace, AND circuit 48 is enabled to pass delayed clock pulses from network 50 to the negative counting input of counter 52a. It will be recalled that a retrace pulse from divider 44 occurs synchronously with one of the clock pulses from multivibrator 42. Thus it is not until six microseconds after flip-flop 8a is set negative that the delayed clock pulse from network 50 is coupled through AND circuit 48 to the negative counting input of counter 52a. Similarly flip-flop 8a is set positive by gate 7a in response to a clock pulse from multivibrator 42. Again it is not until six microseconds after flip-flop 8a is set positive that the delayed clock pulse from network 50 is coupled through AND circuit 46 to the positive counting input of counter 52a. Counter 52a integrates the digital time indications provided by flip-flop 8a. The outputs of counter 52a are, however, highly oscillatory in nature because of the alternate positive and negative counting inherent in pulse-width integration. Accordingly, sampling gates 54a are enabled only in response to a retrace pulse from divider 44. Flip-flops 58a store the sampled output of counter 52a until the next retrace pulse from divided 44. Counter 52b is provided to indicate the steady state magnitude of the inertial input 12a which is to be integrated. Counter 52b merely translates the digital time indication of flip-flop 8a to a binary-coded form. Sampling gates 54b are actuated during retrace, causing flip-flops 58b to store a sampled value of the output of counter 52b. Three microseconds after retrace a pulse from delay network 50a resets counter 52b to zero in preparation, three microseconds subsequently, for the first of the negative counting pulses from AND circuit 48. The resetting of counter 52b to zero upon a delayed pulse from divider 44 prevents the counter from acting as an integrator. Device 10a has an additional time lag, not present in the electronic integrator 16 of FIGURE 1, which is occasioned by the fact that the sensitive element cannot immediately assume a velocity proportional to the difference between the force of the inertial input 12a and the force produced by current through winding 14a. The sensitive element must be accelerated to achieve its steady state damped velocity. At higher frequencies, device 10a introduces an additional ninety degree phase shift due to the inertia of the sensitive element. Thus the total phase shift at higher frequencies approaches one hundred eighty degrees and creates problems of stability. Accordingly, I employ a phase load or differentiating capacitor 30 to stabilize the closed loop response. Again integrator 24 causes pick-off 16a to operate at a null, thereby eliminating error in the integrated digital indications at terminals 60. The analog-to-digital conversion provided by ramp generator 6a need not be highly accurate, since its digitizing function is entirely within the feedback loop. Device 10a integrates not the voltage supplied but the actual current that flows through forcing winding 14a. Accordingly, it may be desirable to provide in series with winding 14a a negative temperature coefficient resistor to compensate for the positive temperature coefficient of resistance of winding 14a. As will be appreciated by those skilled in the art, suitable current regulating means may also be employed to maintain constant the flow of current from battery 2. Forcing winding 14a presents a slightly inductive load. If the inductance of winding 14a is .013 henry, and the total series resistance of winding 14a and its negative temperature coefficient compensating resistor is 10,000 ohms, then the time-constant of winding 14a, represented by the ratio of inductance to resistance, is 1.3 microseconds. The nine microsecond clock pulse period thus represents an interval which is seven times as long as the time-constant of winding 14a. If the mark-space ratio of flip-flop 18a were permitted to vary from unity to such an extent that flip-flop 8a were in one state for one clock pulse period and in the other state for ten clock pulse periods, then the inherent error due to nonequivalence of positive and negative pulses would be one part in one thousand. In general it is desirable to limit the inherent error due to nonequivalence of positive and negative pulses to a value less than one part in one million. If the excursion of the mark space ratio of flip-flop 8a from unity is so limited that the flip-flop is in one state for at least two clock pulse periods and in the other state for not more than nine clock pulse periods, then the inherent nonequivalency error would be reduced to one part in one million, since the minimum interval of current flow is fourteen times as long as the time constant of winding 74a. The maximum count which may be provided at terminals 62 is plus or minus seven. With the duty cycle of flip-flop 8a so restricted that it is in neither state for less than two clock periods or for more than nine clock periods, the sampled output of counter 52b which appears at terminals 62 cannot exceed plus or minus seven. However, since counter 52b first counts negatively following a reset pulse, it should have the capability of a negative count of nine in order to accommodate a minus seven output at terminals 62. Since pulse divider 44 divides by an odd number, no even representation can appear at terminals 62. The eight possible outputs at terminals 62 are thus plus or minus one, three, five, or seven. It will be appreciated that if divider 44 were to divide the clock pulses by an even number, then no odd representation could appear at terminals 62. The elements 50a, 52b, 54b, 58b and 62 are not required in the embodiment shown in FIGURE 2 but are provided for use in the embodiment shown in FIGURE 3.

Referring now to FIGURE 3 the output of phase-sensitive demodulator 16c is connected through direct-coupling resistor 28 and differentiating capacitor 30 to the input of a high gain direct-current amplifier 19. The output of amplifier 19 is connected to one terminal of forcing winding 14a. The other terminal of winding 14a is connected to the input of amplifier 16 which is provided with feedback capacitor 18. The output of amplifier 16 is coupled to an element 1 which comprises an analog-to-digital converter, a digital-to-analog converter, and a digital integrator. The analog-to-digital converter provides the digital indications S, 1, 2, and 4 at terminals 62 in agreement with the analog output of integrator 16. Element 1 is provided with clock pulses from multivibrator 42 and delayed clock pulses from network 50. Element 1 is supplied with a stable voltage source such as battery 2 and a ground reference input. The output of the digital-to-analog converter of element 1 is coupled through feedback resistor 14 to the input of amplifier 16. The digital integrator of element 1 provides 1, 2, 4, 8, and 16 outputs at terminals 60. The S terminal 62 is connected to the S input of a circuit 53 which performs either digital addition or digital subtraction in accordance with the sign input S. Terminals 60 are connected respectively to the 1, 2, 4, 8, and 16 inputs of circuit 53. Circuit 53 provides outputs at the 1, 2, 4, 8, and 16 terminals indicated generally by the reference numeral 60a. The 1 terminal 62 is connected to the 2 input of circuit 53; the 2 terminal 62 is connected to the 4 input of circuit 53; and the 4 terminal 62 is connected to the 8 input of circuit 53.

In operation of the circuit of FIGURE 3, two feedback loops are employed. The first feedback loop is conventional in that the output of pick-off 16a is amplified and coupled to forcing winding 14a. Pick-off 16a operates substantially at a null because of the high gain of amplifier 19. Differentiating or phase lead capacitor 30 is employed to stabilize this first feedback loop because of the mass of the sensitive element which prevents it from immediately assuming a velocity proportional to the force of an inertial input 12a. The phase lead circuit comprising resistor 28 and capacitor 30 also includes a loading resistor 27 which connects the input of amplifier 19 to ground. In FIGURE 3, the action of device 10a as a mechanical integrator is supressed in favor of electronic integrator 10. The feedback current supplied by amplifier 19 through winding 14a is the input current to electronic integrating amplifier 16. Here it is important that integrator 10 have low drift, since the system drift rate is the resultant of the drifts in both integrator 10 and gyro 10a. In FIGURE 3, element I may comprise either of the embodiments shown in FIGURES 1 and 2. It will be noted in FIGURE 3 that the output of integrating amplifier 16 is not subjected to further integration. Futhermore, since the feedback loop to resistor 14 includes the electronic integrator 10 rather than a mechanical integrator, no differentiating or phase lead capacitor need be provided. In the embodiment of FIGURE 3, the output of integrator 16 is bounded and is proportional to the magnitude of the inertial input 12a. However, the output of integrator 16 does not operate substantially at a null and represents an additional analog integration the results of which must be added to the digital integration provided at output terminal 60. The outputs 62 of the analog-to-digital converter are proportional to the output of electronic integrator 10. Circuit 53 digitally combines the outputs at terminals 60 with a scale factor correction of the outputs at terminals 62 in accordance with the sign input S to provide at output terminals 60a the true digital integration of the current through winding 14a. Here the analog-to-digital converter should be fairly accurate, since its digital indications are used open loop in circuit 53 with no corrective negative feedback. Suppose in each integration period the maximum angular change is .0001 degree, corresponding to a seven output at terminals 62. In the embodiment of FIGURE 1 the integration period is nine microseconds. This yields a maximum angular rate of .0001 degree per nine microsecond period which corresponds to eleven degrees per second. In the embodiment of FIGURE 2 the integration period is one hundred microseconds which yields a maximum angular rate of one degree per second. Suppose that device 10a is an integrating, velocity-damped, single-degree-of-freedom gyroscope, the gimbal pick-off 16a of which has an angular uncertainty of .0002 degree. Further assume that the amplification factor of the gyroscope, that is, the ratio of gimbal rotation to inertial input rotation is twenty. Thus the uncertainty in input rotation 12a is only .00001 degree. The output of integrator 10 contains this same uncertainty. In order to prevent instability or jitter in the digitizing of the output of integrator 10, the minimium step-change may be three times as great as the uncertainty and thus correspond to .00003 degree of inertial input. When the maximum count at terminals 62 is seven, the corresponding inertial input rotation 12a is .0002 degree. A seven output at terminals 62 represents not only an angular rate of .0001 degree per integration period but also an input rotation of .0002 degree. Thus the scale factor with which the outputs at terminal 62 are combined with the outputs at terminal 60 must be two-to-one. Accordingly, the 1, 2, and 4 outputs 62 are shown connected respectively to the 2, 4, and 8 inputs of circuit 53. These connections effectively double the outputs at terminals 62. In order to hold the overall accuracy of integration to .0001 degree, it is necessary to supply the correction of .0002 degree which is represented by the output of analog integrator 10. It will be appreciated that if the angular uncertainty of the gimbal pickoff were .0004 degree or if the amplification factor of the gyroscope were ten, then the maximum output of integrator 10 would represent .0004 degree. This would require that the outputs at terminals 62 be multiplied by a scale factor of four. In such event the 1, 2, and 4 outputs at terminals 62 would be connected respectively to the 4, 8, and 16 inputs of circuit 53. Multiplying circuit 51 may be of the simple construction shown so long as the scale factor correction is an integral power of the particular digital system number. In the binary digital system shown, multiplication by a factor of two, four, or eight is readily accomplished by a respective shift of one, two, or three places of significance.

Referring now to FIGURE 4, I have shown an embodiment similar to FIGURE 2. However, the digital outputs of flip-flop 8a are not directly employed to generate a pulse-width modulation analog feedback signal. Rather, I provide a weighted-bit digital-to-analog converter 4 as in FIGURE 1. The digital outputs of flip-flop 8a again control counter 52b which is periodically reset to zero. The sampled outputs 62 of counter 52b are coupled to the corresponding inputs of the weighted-bit digital-to-analog converter 4. Converter 4 is supplied by a stable current source including battery 2. The outputs of converter 4 are coupled to winding 14a. Furthermore, in FIGURE 4 the pulse-width modulation is controlled by a stair-case generator 6d rather than the smoothly rising ramp generator 6a of FIGURE 2. Stair-case generator 6d provides an analog output varying monotonically in equal steps in response to clock pulses from monostable multi-vibrator 42 which are coupled to the indexing input. The output of the pulse divider circuit 44 is coupled to the retrace or reset input of stair-case generator 6d. It will be appreciated that stair-case generator 6d actually provides eleven steps between successive reset pulses because of the eleven to one pulse division provided by dividing circuit 44; however for purposes of simplicity the stair-case wave-form is shown provided only with five voltage steps. In FIGURE 4, since the output of stair-case generator 6d changes in discrete steps, the output of differential amplifier 6b likewise has the characteristic of a sudden digital change when the output of stair-case generator 6d steps from a value which is less than to a value which is greater than that existing at the first input of the differential amplifier. Accordingly, in FIGURE 4 the presence of gate 7a and its synchronous actuation by clock pulses from multi-vibrator 42 is not essential. As in FIGURE 2, since device 10a is a mechanical analog integrator, it is necessary to provide phase lead capacitor 30 to stabilize the system against the additional phase lag due to inertia of the movable pick-off 16a. The embodiment of FIGURE 4 may likewise be used for element 1 of FIGURE 3.

In FIGURES 1 and 4 the feedback current is constant during each integration period. In FIGURE 2, the feedback current is alternately gated positive and negative during each integration period, but the current from battery 2 is nominally constant. Because of the inductance of winding 14a, switching transients would cause some ripple in the flow of current from battery 2. However, I shunt winding 14a with a compensating circuit, indicated generally by the reference character 14b, which comprises a series-connected resistor and capacitor. The resistor of circuit 14b should have a value of 10,000 ohms which is equal to the total series resistance of winding 14a. The time-constant of circuit 14b should be equal to that of winding 14b. Accordingly, the capacitor of circuit 14b should have a value of 130 micro-microfarads to yield a time-constant of 1.3 microseconds. With the provision of circuit 14b, the flow of current from battery 2 remains constant. By employing a current regulator to insure a constant current flow from battery 2, the equality of positive and negative currents is secured despite unequal resistances of the switching gates 4a through 4d.

It will be seen that I have accomplished the objects of my invention. My feedback integrating system has a proportional response as indicated by the steady-state representation at terminals 62 of the quantity to be integrated. Since my system has a proportional response, the magnitude of oscillations is rendered negligible. My system thus yields accurate digital indications and obviates the magnification of errors due to nonequivalency of positive and negative feedback signals. In FIGURES 1 and 4, a substantially direct-current feedback is provided by weighted-bit converter 4. This enables a high clock frequency to be employed irrespective of the time-constant of the forcing winding. In FIGURE 2, the alternate positive and negative gating causes a constant direct-current flow from battery 2. By maintaining constant the current from battery 2, the equivalence of positive and negative pulses is assured. In FIGURE 3, the problems arising from the time-constant of the forcing winding and the inertial time lag of the sensitive element in mechanical integrators are eliminated by employing a tight feedback loop which supplies the input current to an electronic integrator.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A feedback integrating system including in combination a first analog integrator, a second analog integrator, an analog-to-digital converter, a digital-to-analog converter, a source of an analog quantity, means coupling the first analog integrator to the second analog integrator, means coupling the first and second analog integrators to the analog-to-digital converter, means coupling the analog-to-digital converter to the digital-to-analog converter, and means coupling the digital-to-analog converter and the analog source to the first analog integrator.

2. A feedback integrating system including in combination an analog integrator, an analog-to-digital converter, a digital integrator, a digital-to-analog converter, a digital multiplier, a digital adder, a source of an analog quantity, means coupling the analog integrator to the analog-to-digital converter, means coupling the analog-to-digital converter to the digital integrator and to the digital-to-analog converter and to the digital multiplier, means coupling the digital integrator and the digital multiplier to the digital adder, and means coupling the digital-to-analog converter and the analog source to the analog integrator.

3. A feedback integrating system including in combination a velocity-restrained inertially responsive device having a forcing winding and a pickoff, means responsive to the pickoff for providing current through the forcing winding, a low-drift analog integrator having a high frequency response, an analog-to-digital converter, a digital integrator, a digital-to-analog converter providing a feedback current, means coupling the analog integrator to the analog-to-digital converter, means coupling the analog-to-digital converter to the digital integrator and to the digital-to-analog converter, and means coupling the feedback and forcing winding currents to the analog integrator.

4. A feedback integrating system including in combination a source of an analog quantity, an analog integrator, a constant frequency source of clock pulses, a weighted-bit analog-to-digital converter providing an output, means for sampling the output, means for storing the sampled output, means responsive to clock pulses for actuating the sampling means, digital integrating means, means coupling the analog integrator to the analog-to-digital converter, a weighted-bit digital-to-analog converter, means coupling the storing means to the digital-to-analog converter and to the integrating means, means responsive to clock pulses for actuating the integrating means, and means coupling the analog source and the digital-to-analog converter to the analog integrator.

5. A feedback integrating system including in combination a source of an analog quantity, an analog integrator, a constant frequency source of clock pulses, means for dividing the rate of the clock pulses by an integral factor to produce recycling pulses, staircase generating means for providing an analog output varying monotonically in equal steps in response to clock pulses, means responsive to recycling pulses for resetting the output of the staircase generator, an analog comparator, means coupling the analog integrator and the output of the staircase generator to the comparator, means responsive to the comparator for providing an analog signal, digital integrating means responsive to the comparator and to clock pulses, the integrating means comprising a reversible counter, and means coupling the analog signal and the analog source to the analog integrator.

6. A feedback integrating system including in combination a velocity-restrained inertially responsive device having a forcing winding and a pickoff, means responsive to the pickoff for providing current through the forcing winding, a low-drift analog integrator having a high frequency response, an analog-to-digital converter, a digital-to-analog converter providing a feedback current, means coupling the analog integrator to the analog-to-digital converter, means coupling the analog-to-digital converter to the digital-to-analog converter, and means coupling the feedback and forcing winding currents to the analog integrator.

7. A feedback integrating system including in combination a source of an analog quantity, an analog integrator, a weighted-bit analog-to-digital converter providing an output, means for sampling the output, means for storing the sampled output, means coupling the analog integrator to the analog-to-digital converter, a weighted-bit digital-to-analog converter, means coupling the storing means to the digital-to-analog converter, and means coupling the analog source and the digital-to-analog converter to the analog integrator.

8. A feedback integrating system including in combination a source of an analog quantity, an analog integrator, a constant frequency source of clock pulses, means for dividing the rate of the clock pulses by an integral factor to produce recycling pulses, pulse-width modulation means responsive to the analog integrator and to the recycling pulses, reversible and resettable counting means responsive to the clock pulses, means responsive to the modulation means for reversing the counting means, digital storage means, means including sampling means for coupling the counting means to the storage means, means responsive to the recycling pulses for actuating the sampling means and for resetting the counting means, a weighted-bit digital-to-analog converter, means coupling the storage means to the converter, and means coupling the converter and the analog source to the analog integrator.

9. A feedback integrating system including in combination a velocity-restrained inertially responsive device having a forcing winding and a pickoff, the forcing winding having an inductive-resistive time-constant, pulse-width modulation means responsive to the pickoff, a constant current source, means shunting the forcing winding with a network having a capacitive-resistive time-constant which is the same as that of the forcing winding to form a pure resistive composite circuit, means for reversibly coupling the constant current source to the composite circuit, and means responsive to the modulation means for actuating the reversible coupling means.

References Cited by the Examiner

UNITED STATES PATENTS

| | | | |
|---|---|---|---|
| 2,932,449 | 4/60 | Pisarchik | 235—183 XR |
| 2,950,052 | 8/60 | Knox | 235—154 |
| 2,988,737 | 6/61 | Schroeder | 340—347 XR |
| 2,996,669 | 8/61 | Morgan et al. | 73—517 |
| 3,028,550 | 4/62 | Naydan et al. | 324—70 |
| 3,030,814 | 4/62 | Ainsworth | 73—517 XR |
| 3,042,911 | 7/62 | Paradise et al. | 340—347 |
| 3,062,442 | 11/62 | Boensel et al. | 340—347 XR |

OTHER REFERENCES

Grabbe et al.: Handbook of Automation, Computation, and Control, pages 30–14 and 30–15, 1959.

Irwin: Digital Computer Principles, D. Van Nostrand Co., pages 114–115, 1960.

The Radio Amateur's Handbook, American Radio Relay League, page 145, 1954.

MALCOLM A. MORRISON, *Primary Examiner.*

WALTER W. BURNS, JR., *Examiner.*